(12) United States Patent
Gadsing

(10) Patent No.: US 8,583,966 B2
(45) Date of Patent: Nov. 12, 2013

(54) METHODS AND STRUCTURE FOR DEBUGGING DDR MEMORY OF A STORAGE CONTROLLER

(75) Inventor: Sagar G. Gadsing, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 306 days.

(21) Appl. No.: 13/097,434

(22) Filed: Apr. 29, 2011

(65) Prior Publication Data

US 2012/0278662 A1 Nov. 1, 2012

(51) Int. Cl.
*G06F 11/00* (2006.01)
(52) U.S. Cl.
USPC .......................................................... 714/42
(58) Field of Classification Search
USPC .......................................................... 714/42
See application file for complete search history.

(56) References Cited

U.S. PATENT DOCUMENTS

| | | |
|---|---|---|
| 2008/0276133 A1 | 11/2008 | Hadley et al. |
| 2009/0125767 A1* | 5/2009 | Linzer .......................... 714/727 |

OTHER PUBLICATIONS

Freescale Semiconductor "Simplifying Board Bringup," Document No. AN3366, Rev.1, May 2007.*
Freescale Semiconductor ("CodeWarriror USB TAP Users Guide," Nov. 11, 2005.*

* cited by examiner

*Primary Examiner* — Michael Maskulinski
*Assistant Examiner* — Neil Miles
(74) *Attorney, Agent, or Firm* — Duft Bornsen & Fettig LLP; Gregory T. Fettig

(57) ABSTRACT

Methods and structure for diagnosing errors in the initialization of DDR memory "on board" a storage controller or a storage expander are presented herein. The features and aspects discussed herein allow for the debugging of the DDR memory initialization. A memory diagnostic system is operable on a storage controller and includes an initialization module in communication with a firmware module of the storage controller. The memory diagnostic system is adapted to initialize a Double Date Rate (DDR) memory of the storage controller. The memory diagnostic system also includes an application programming interface adapted to retrieve initialization information from the initialization module and transfer the initialization information to a debug system via a direct communication link between the application programming interface and the debug system to diagnose the initialization of the DDR memory and to debug the initialization module based on the initialization information.

20 Claims, 4 Drawing Sheets

METHODS AND STRUCTURE FOR DEBUGGING DDR MEMORY OF A STORAGE CONTROLLER

BACKGROUND

1. Field of the Invention

The invention relates generally to storage controllers and storage network switching components and more specifically to methods and structures for debugging Double Data Rate ("DDR") memory thereof.

2. Discussion of Related Art

Modern computer processing hosts a relatively large number of complex applications using ever increasingly high data rates. The processors involved are generally configured with high-speed memory devices, such as double-data rate (DDR) synchronous dynamic random access memory (SDRAM). The DDR SDRAM is approximately twice as fast as a single data rate SDRAM running at the same clock speed because a DDR SDRAM transfers data on both the rising and falling edge of a differential clock provided by a DDR controller.

The higher data rate speeds of DDR memory may present issues regarding the timing of data transfers. Since data is transferred at both the rising edge and falling edge of the clock input, timing requirements of a DDR memory oftentimes demand a more precise synchronization for both data write and read operations. Synchronization problems may result in errors while reading data from memory and writing data to memory. Generally, a DDR controller generates internal clock pulses for synchronizing data write operations and read operations. For example, clock and/or control signals may become desynchronized due to physical characteristics of the devices mounted on the board and changes in the environment in which the memory is operating. Examples of the environmental conditions include voltage and temperature changes may cause drift from an optimal operating point of the DDR memory.

Because of the higher speeds at which DDR memory operates, the memory functions with a narrow valid data window or "eye" in which data is processed. Failure to properly read or write data within this data window results in errors being generated within the system. Other factors such as jitter and skew due to mismatched board trace lengths may also give rise to errors. Accordingly, the DDR memory is typically initialized via firmware to establish synchronization for the DDR and a device with which the memory is configured.

Storage controllers and switching components in the data storage industry are examples of devices that employ DDR memory due to their ever increasing speeds and the desire for faster performance The increasing speed of DDR memory, however, has made debugging of the DDR memory interface increasingly important. For example, end users of the storage controllers often create their own means for initializing the DDR memory. Such is generally done via the introduction of proprietary firmware being implemented by the end user in the storage controller after delivery of the storage controller from the manufacturer. This implementation of proprietary DDR initialization introduces new debugging challenges to the storage controller manufacturers that are required to fix delivered storage controllers when problems arise. To counter this, manufacturers created initialization modules for the DDR memory of the storage controller. These DDR initialization modules have a pre-defined application programming interface (API) that end users would integrate into their existing firmware. While this provided a more reliable method for initializing the DDR memory, a manufacture still relied on an end user properly integrating the DDR initialization module to ensure that the interface functioned correctly. Any incorrect implementation would again result in time consuming and costly debugging of the DDR memory.

SUMMARY

The present invention addresses the above and other problems, thereby advancing the state of the useful arts, by providing methods and structure for diagnosing errors in the initialization of DDR memory "on board" a storage controller or a storage network switching component, generally referred to herein as storage controllers. The features and aspects discussed herein allow for the debugging of the DDR memory initialization. In one aspect hereof, a memory diagnostic system operable on a storage controller or a storage network switching component includes an initialization module in communication with a firmware module of the storage controller and adapted to initialize a DDR memory of the storage controller. The firmware module is operable to control I/O operations of the storage controller. The memory diagnostic system also includes an application programming interface adapted to retrieve initialization information from the initialization module and transfer the initialization information to a debug system via a direct communication link between the application programming interface and the debug system to diagnose the initialization of the DDR memory and to debug the initialization module based on the initialization information.

The memory diagnostic system may also include a host system communicatively coupled to the firmware module of the storage controller and adapted to detect errors in the initialization of the DDR memory and compare the detected errors to the initialization information to debug the firmware module. For example, the debug system may be communicatively coupled to the host system and adapted to transfer the initialization information to the host system for debugging the firmware module. The application programming interface may be further operable to link to the host system through the firmware module. The application program interface may be operable to receive debug instructions from the debug system to change the initialization module.

In one aspect hereof, a method and a computer-readable medium are operable to diagnose DDR memory initialization errors on a storage controller. The method includes initializing DDR memory of the storage controller via a DDR memory initialization module and detecting an error in the initialization of the DDR memory via a host system. The method also includes establishing a direct communication link between a debug system and the DDR initialization module to retrieve initialization information from the DDR initialization module and determining if the error is attributed to the DDR initialization module to debug the DDR initialization module based on the initialization information.

The method may also include communicatively coupling a host system to a firmware module of the storage controller to detect errors in the initialization of the DDR memory and comparing the detected errors to the initialization information to debug the firmware module. For example, the method may also include communicatively coupling the debug system to the host system to transfer the initialization information to the host system for debugging the firmware module. The method may also include linking an application programming interface to the host system through the firmware module. The method may also include transferring debug instructions from the debug system to the DDR initialization module to change the DDR initialization module.

DETAILED DESCRIPTION OF THE DRAWINGS

Figure 1:
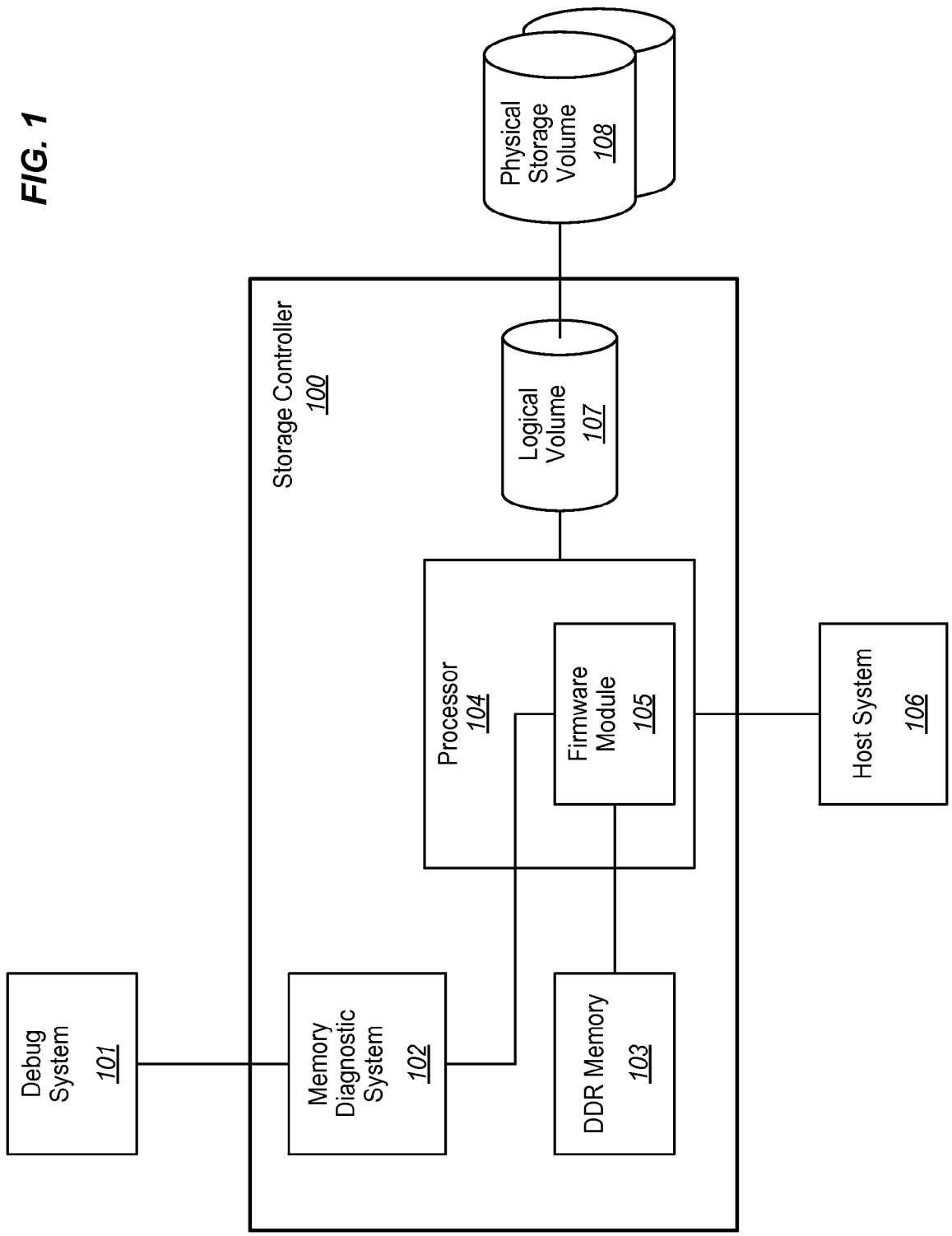
FIG. 1 is a block diagram of an exemplary system enhanced in accordance with features and aspects hereof to provide diagnostic and debug capabilities of DDR memory on storage controllers and expanders.

FIG. 1 is a block diagram of an exemplary system 102 enhanced in accordance with features and aspects hereof to provide diagnostic and debug capabilities of DDR memory 103. For the purpose of simplicity, the discussion of the memory diagnostic system 102 will be focused on storage controllers as illustrated with the storage controller 100 of FIG. 1. Those skilled in the art, however, should readily recognize that the memory diagnostic system 102 may be implemented "on board" a storage network switching element as well. As such, the term storage controller is intended as a generic term that also encompasses all comparable storage devices.

In accordance with features and aspects hereof, the memory diagnostic system 102 is operable to diagnose problems with the DDR memory 103 such that a debug system 101 may correct these problems. In this regard, the memory diagnostic system 102 is any hardware, software, or firmware operable on the storage controller 100 to detect errors in the DDR memory 103 and report these errors to the debug system 101. The debug system 101 is any processing system, such as a computer, capable of interfacing with the storage controller 100 through the memory diagnostic system 102 to debug initialization problems that the DDR memory 103 is experiencing.

The storage controller 100 includes, among other things, a processor 104 that is operable to control input/output (I/O) requests to a plurality of physical storage volumes 108 via the logical volume 107. For example, the processor 104 may include a firmware module 105 that directs the processor 104 to treat the physical storage volumes 108 as a single logical volume 107 such that the host system 106 may access the physical storage volumes 108 as a single storage device. Those skilled in the art of storage systems are readily familiar with storage controllers and their abilities to consolidate multiple physical storage volumes into a single logical volume. In this regard, the firmware module 105 is operable to direct a processor to control I/O operations to the physical storage volumes 108 through the logical volume 107. The firmware module 105 is also operable to initialize the DDR memory 103 by calling certain components of the memory diagnostic system 102, as described in greater detail below. For example, the DDR memory 103 is typically initialized via a "memory controller", an integrated circuit that is part of the family of components associated with the processor. The memory controller performs the actual signaling control of the memory subsystem on behalf of the processor 104. In other words, the processor 104 is usually coupled to the memory controller that is, in turn, coupled to the DDR memory 103. The DDR memory 103 initialization is therefore typically implemented via the programming of configuration registers in the memory controller by the processor 104.

Examples of storage controllers and storage network switching elements include Serial Attached SCSI ("SAS") controllers and expanders or Fibre Channel (FC) controllers and switches. Small Computer Systems Interface ("SCSI") is a set of American National Standards Institute ("ANSI") standard electronic interface specification that allows, for example, computers to communicate with peripheral hardware. Common SCSI compatible peripheral devices may include: disk drives, tape drives, CD drives ("CD-ROM", "CD-RW", etc), DVD drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. SCSI is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands, such as SAS, are also used to interconnect networks of storage devices with processing devices. Serial Advanced Technology Attachment ("SATA") is another example of a transport protocol. These applications are often referred to as storage networks. Those skilled in the art are familiar with SAS and SATA standards as well as other SCSI related specifications and standards. Information about such interfaces and commands is generally obtainable at the website http://www.t10.org. As used herein, reference to SAS devices and protocols may be understood to include SATA devices and protocols. The problems discussed herein and the solutions provided by this invention are similarly applicable to SATA devices.

Such SCSI storage networks are often used in large storage systems having a plurality of disk drives to store data for organizations and/or businesses. The network architecture allows storage devices to be physically dispersed in an enterprise while continuing to directly support SCSI commands. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators, such as the host system 102, initiate communications with SAS targets, such as the physical storage volumes 108. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as PHYs in the terminology of SAS domains. A port may use a single PHY or, if the port is configured as a wide port, may use multiple PHYs logically grouped to provide higher bandwidth.

Figure 2:
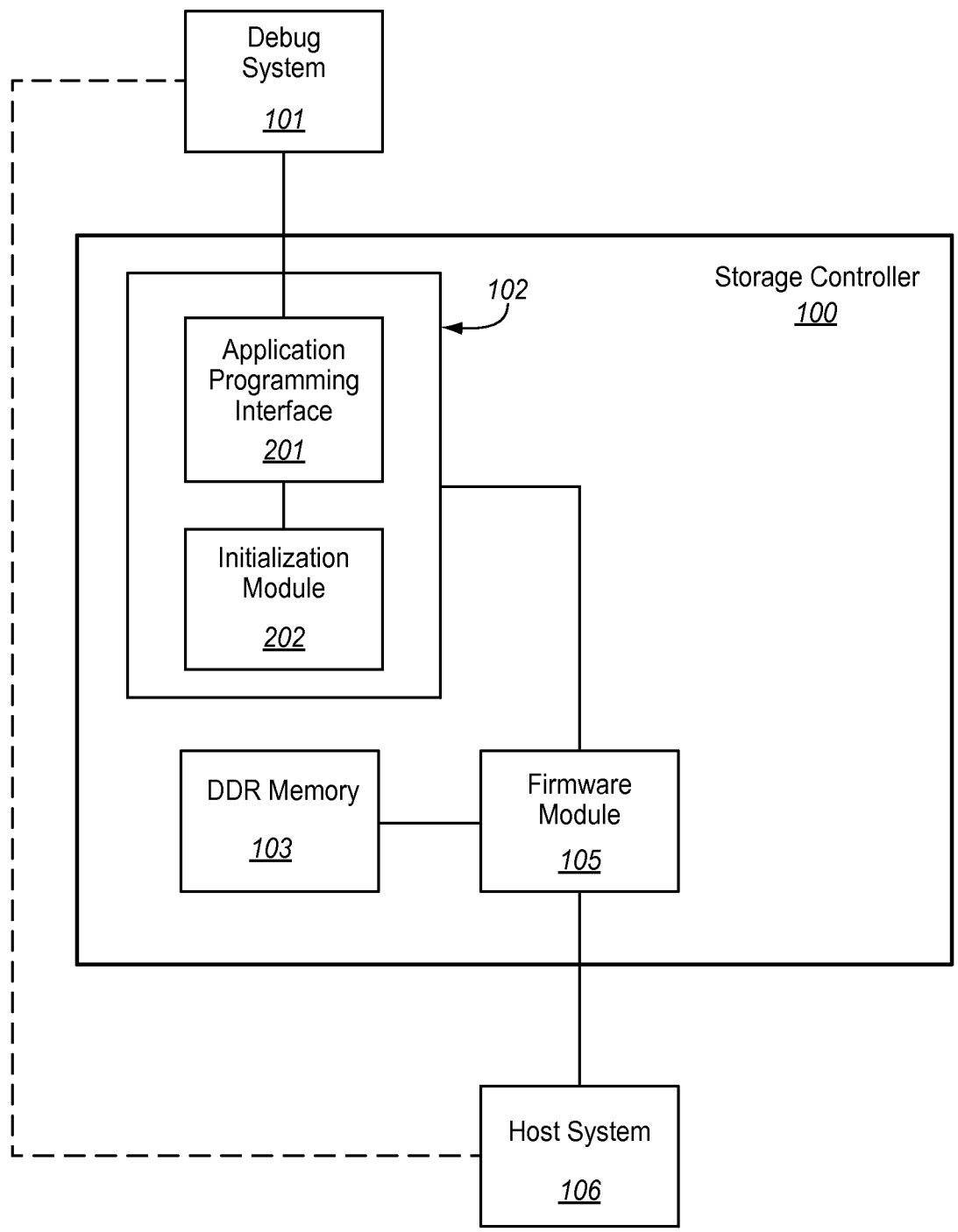
FIG. 2 is a more detailed block diagram of the exemplary system enhanced in accordance with features and aspects hereof to provide diagnostic and debug capabilities of the DDR memory on storage controllers and expanders.

FIG. 2 is a more detailed block diagram of the exemplary memory diagnostic system 102 enhanced in accordance with features and aspects hereof to provide diagnostic and debug capabilities to the DDR memory 103. In this embodiment, the memory diagnostic system 102 comprises an API 201 and an initialization module 202. The initialization module 202 comprises any component (e.g., software, hardware, firmware, or a combination thereof) operable on the storage controller 100 to communicate with the firmware module 105 of the storage controller 100 to initialize the DDR memory 103. The API 201 comprises any component (e.g., software, hardware, firmware, or a combination thereof) operable on the storage controller 100 to retrieve initialization information from the initialization module 202 and transfer the initialization information to the debug system 101 via a direct communication link between the API 201 and the debug system 101 to diagnose the initialization of the DDR memory and to debug the initialization module 202 based on the initialization information. For example, the API 201 may be accessed by the debug system 101 through a direct communication link such that the debug system 101 may retrieve the initialization information from the initialization module 202. Examples of such a communication link include Ethernet, SCSI, and the like.

In this embodiment, the host system 106 is also communicatively coupled to the debug system 101 to receive the initialization information for debugging the firmware module 105. For example, the firmware module 105 may retrieve initialization code from the initialization module 202 that is operable to initialize the DDR memory 103. If the implementation of this initialization code by the firmware module 105 improperly initializes the DDR memory 103, the initialization code is debugged to correct any errors causing the faulty initialization. Since there are effectively two modules controlling the DDR memory 103 (i.e., the initialization module 202 and the firmware module 105 calling the initialization module 202, it is difficult to determine where the errors in initialization are occurring. The API 201, therefore, is operable to communicate with the initialization module 202 to present the errors that are attributed to the initialization to the debug system 101. The debug system 101 may then determine that there are errors in the initialization module 202. If so, the debug system 101 may debug and correct the initialization module 202 such that the firmware module 105 can properly call the initialization module 202 and perform initialization of the DDR memory 103. If, however, the errors are occurring due to the firmware module 105 use of the initialization module 202, the debug system 101 may present the initialization information to the host system 106 to verify that the errors are not attributed to the initialization module 202. Accordingly, the host system 106 may be operable to communicate with the firmware module 105 (e.g., through the API 201) to debug the firmware module 105 and subsequently correct its implementation of the initialization module 202. More specifically, the host system 106 may detect errors in the initialization of the DDR memory 103 and compare the detected errors to the initialization information to debug the firmware module 105, effectively ruling out the initialization module 202 as the source of the errors.

The API 201 may be a function call to the initialization module 202 for the transfer of information between the initialization module 202 and the debug system 101. The API 201 may be defined depending on the type of information the debug system 101 requires of the initialization module 202. The API 201 may also define the information that the initialization module 202 sends to the debug system 101. For example, the API 201 may define timing information detected by the initialization module 202, warnings (e.g., detected eyes being too small), and/or any critical errors messages (e.g., the DDR memory 103 does not support the clock speed that the debug system 101 requires of the initialization module 202). This information may then be transferred to the debug system 101 via the API 201.

Figure 3:
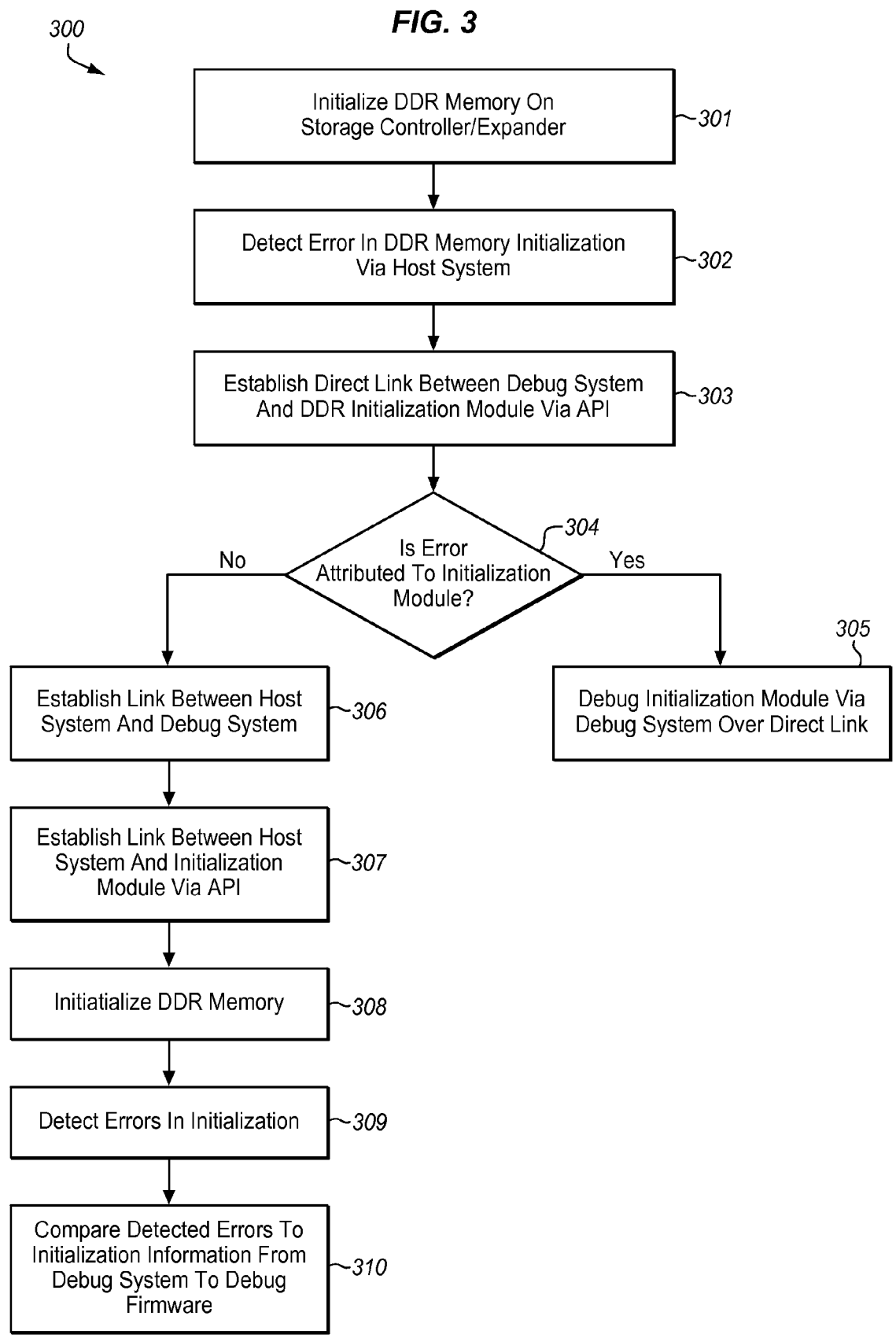
FIG. 3 is a flowchart describing an exemplary method in accordance with features and aspects hereof to provide diagnostic and debug capabilities of the DDR memory on storage controllers and expanders.

FIG. 3 is a flowchart 300 describing an exemplary method 300 in accordance with features and aspects hereof to provide diagnostic and debug capabilities of DDR memory on storage controllers and expanders. In this regard, the method 300 may be operable on the systems shown and described in FIGS. 1 and 2. In this embodiment, the DDR memory is initialized on the storage controller/expander, in the process element 301. For example, the processor 104 may direct the firmware module 105 of FIG. 1 to initialize the DDR memory 103 using the initialization module 202. As the DDR memory initializes, errors due to the faulty implementation of the initialization module 202 and/or the firmware module 105 may cause the storage controller 100 to operate improperly. The initialization errors may then be detected via a host system connection to the firmware module, in the process element 302. This error detection may trigger the host system to communicate with a debug system to determine the source of the errors. The debug system may, in turn, establish a direct link to the DDR initialization module (e.g., via the API 201), in the process element 303. Thereafter, the debug system may determine whether the error(s) is due to the initialization module or some other aspect of the storage controller, such as the firmware module's 105 implementation of the initialization module 202. If the error is attributed to the initialization module, then the debug system may identify the reason for the error and debug the initialization module over the direct link (e.g., via the API 201), in the process element 305. In this regard, the debug module may transfer debug instructions to change or otherwise reconfigure the initialization module to properly initialize the DDR memory.

If the error is not attributed to the initialization module, then the debug module may establish a link with the host system to communicate the initialization information, in the process element 306. The host system may also establish a link with the firmware module via the API, in the process element 307, to determine the problems associated with the firmware module's implementation of the initialization module. In doing so, the host system may attempt to initialize the DDR memory, in the process element 308, and then begin collecting the associated errors, in the process element 309. The host system may then compare the detected errors to the initialization information, in the process element 310, to debug the firmware module.

Figure 4:
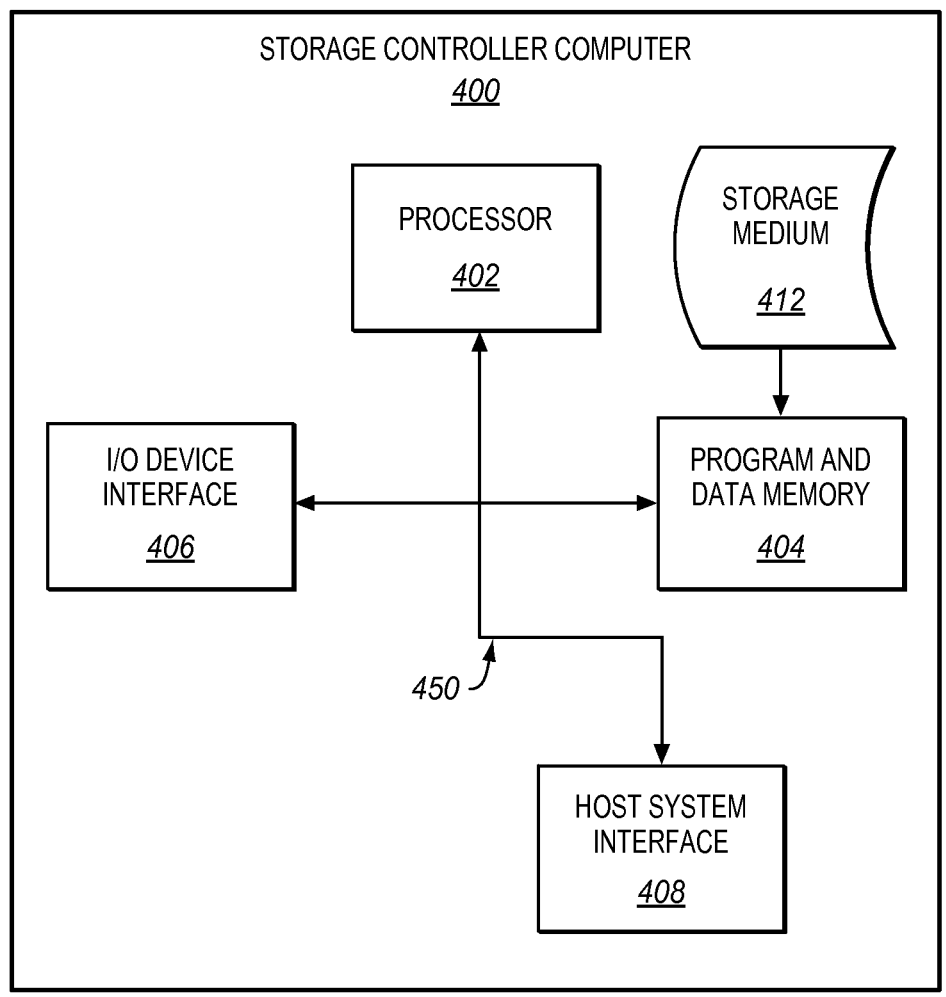
FIG. 4 is a block diagram of a computing system on which a computer readable medium may be used to receive program instructions for implementing methods in accordance with features and aspects hereof.

Embodiments of the invention can take the form of an entirely hardware embodiment, an entirely software embodiment or an embodiment containing both hardware and software elements. In one embodiment, the invention is implemented in software, which comprises but is not limited to firmware, resident software, microcode, etc. FIG. 4 is a block diagram depicting storage controller computer system 400 adapted to provide features and aspects hereof by executing programmed instructions and accessing data stored on a computer readable storage medium 412 for implementing one or more of the methods depicted herein.

Furthermore, embodiments of the invention can take the form of a computer program product accessible from a computer-usable or computer-readable medium 412 providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The storage controller computer system 400 being suitable for storing and/or executing program code includes at least one processor 402 adapted to be coupled directly or indirectly to memory elements 404 through a system bus 450. The memory elements 404 can include local memory employed during actual execution of the program code, bulk storage, and cache memories, which provide temporary storage of at least some program code in order to reduce the number of times code must be retrieved from bulk storage during execution.

Host system interfaces 408 and back end interfaces 406 may be coupled to the processor 402 to enable the storage controller computer system 400 to be coupled with other data processing systems or storage devices through intervening private or public networks. Ethernet cards, Wi-Fi interfaces, Bluetooth Interfaces, are just a few of the currently available types of network or host interface adapters. For example, the I/O device interface 406 may provide a direct communication link between the debug system 101 and the memory diagnostic system 102 for the purposes of debugging the DDR memory 103 initialization.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A memory diagnostic system operable on a storage controller, comprising:
   a processor operable to implement the following:
   an initialization module in communication with a firmware module of the storage controller and adapted to initialize a Double Data Rate (DDR) memory of the storage controller, wherein the firmware module is operable to control I/O operations of the storage controller; and
   an application programming interface adapted to retrieve initialization information from the initialization module and transfer the initialization information to a debug system via a direct communication link between the application programming interface and the debug system to:
   diagnose the initialization of the DDR memory;
   detect an error in the initialization of the DDR memory via a host system, to determine if the error is attributed to the DDR initialization module; and
   to debug the initialization module based on the initialization information.

2. The memory diagnostic system of claim 1, the host system being communicatively coupled to the firmware module of the storage controller and adapted to detect errors in the initialization of the DDR memory and compare the detected errors to the initialization information to debug the firmware module.

3. The memory diagnostic system of claim 2, wherein the debug system is communicatively coupled to the host system and is adapted to transfer the initialization information to the host system for debugging the firmware module.

4. The memory diagnostic system of claim 2, wherein the application programming interface is further operable to link to the host system through the firmware module.

5. The memory diagnostic system of claim 1, wherein the application program interface is operable to receive debug instructions from the debug system to change the initialization module.

6. The memory diagnostic system of claim 1, wherein the storage controller is a SAS controller.

7. The memory diagnostic system of claim 1, wherein the storage controller is a SAS expander.

8. A method of diagnosing Double Data Rate (DDR) memory initialization errors on a storage controller, wherein the storage controller includes a firmware module operable to control input/output operations of the storage controller, the method comprising:
   initializing DDR memory of the storage controller via a DDR memory initialization module;
   detecting an error in the initialization of the DDR memory via a host system; establishing a direct communication link between a debug system and the DDR initialization module to retrieve initialization information from the DDR initialization module; and
   determining if the error is attributed to the DDR initialization module to debug the DDR initialization module based on the initialization information.

9. The method of claim 8, further comprising:
   communicatively coupling the host system to the firmware module of the storage controller to detect errors in the initialization of the DDR memory; and
   comparing the detected errors to the initialization information to debug the firmware module.

10. The method of claim 9, further comprising:
    communicatively coupling the debug system to the host system to transfer the initialization information to the host system for debugging the firmware module.

11. The method of claim 9, further comprising:
    linking an application programming interface to the host system through the firmware module.

12. The method of claim 8, further comprising, transferring debug instructions from the debug system to the DDR initialization module to change the DDR initialization module.

13. The method of claim 8, wherein the storage controller is a SAS controller.

14. The method of claim 8, wherein the storage controller is a SAS expander.

15. A non-transitory computer readable medium embodying programmed instructions that, when executed by a processor, cause a processor to perform a method of diagnosing Double Data Rate (DDR) memory initialization errors on a storage controller, wherein the storage controller includes a firmware module operable to control input/output operations of the storage controller, the method comprising:

initializing DDR memory of the storage controller via a DDR memory initialization module;

detecting an error in the initialization of the DDR memory via a host system; establishing a direct communication link between a debug system and the DDR initialization module to retrieve initialization information from the DDR initialization module; and determining if the error is attributed to the DDR initialization module to debug the DDR initialization module based on the initialization information.

16. The computer readable medium of claim 15, further comprising:

communicatively coupling the host system to the firmware module of the storage controller to detect errors in the initialization of the DDR memory; and comparing the detected errors to the initialization information to debug the firmware module.

17. The computer readable medium of claim 16, further comprising:

communicatively coupling the debug system to the host system to transfer the initialization information to the host system for debugging the firmware module.

18. The computer readable medium of claim 16, further comprising:

linking an application programming interface to the host system through the firmware module.

19. The computer readable medium of claim 15, further comprising, transferring debug instructions from the debug system to the DDR initialization module to change the DDR initialization module.

20. The computer readable medium of claim 15, wherein the storage controller is a SAS controller or a SAS expander.

\* \* \* \* \*